(12) United States Patent
Stacey

(10) Patent No.: US 8,335,198 B2
(45) Date of Patent: Dec. 18, 2012

(54) VARIABLE SHORT INTERFRAME SPACE

(75) Inventor: Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 504 days.

(21) Appl. No.: 12/459,181

(22) Filed: Aug. 3, 2009

(65) Prior Publication Data

US 2011/0026446 A1    Feb. 3, 2011

(51) Int. Cl.
*H04W 4/00* (2009.01)
(52) U.S. Cl. ......... 370/338; 370/328; 370/389; 455/423
(58) Field of Classification Search .................. 370/338, 370/328, 389; 455/423
See application file for complete search history.

(56) References Cited

U.S. PATENT DOCUMENTS

| | | |
|---|---|---|
| 6,272,120 B1 | 8/2001 | Alexander |
| 6,940,843 B2 | 9/2005 | Goodall et al. |
| 6,954,450 B2 | 10/2005 | Krischer et al. |
| 7,031,249 B2 | 4/2006 | Kowalski |
| 7,046,650 B2 | 5/2006 | Sherman |
| 7,151,759 B1 | 12/2006 | Ryan et al. |
| 7,161,909 B2 | 1/2007 | Sharma |
| 7,317,687 B2 | 1/2008 | Del Prado Pavon et al. |
| 2002/0034172 A1 | 3/2002 | Ho |
| 2002/0122413 A1 | 9/2002 | Shoemake |
| 2006/0034248 A1 | 2/2006 | Mishra et al. |
| 2006/0035589 A1 | 2/2006 | Shvodian |
| 2006/0268886 A1 * | 11/2006 | Sammour et al. ............. 370/394 |
| 2007/0110055 A1 * | 5/2007 | Fischer et al. ................ 370/389 |
| 2007/0153830 A1 * | 7/2007 | Xhafa et al. .................. 370/470 |
| 2008/0013496 A1 * | 1/2008 | Dalmases et al. ............ 370/336 |
| 2008/0037465 A1 | 2/2008 | Ngo et al. |
| 2008/0181251 A1 * | 7/2008 | Nishibayashi et al. ....... 370/445 |
| 2008/0240078 A1 * | 10/2008 | Thubert et al. ................ 370/351 |

FOREIGN PATENT DOCUMENTS

| | | |
|---|---|---|
| KR | 10-2006-0106899 A | 10/2006 |
| WO | 2011/016960 A2 | 2/2011 |

OTHER PUBLICATIONS

International Search Report and Written Opinion Received for PCT Patent Application No. PCT/US2010/041993, mailed on Feb. 22, 2011, 9 pages.

* cited by examiner

*Primary Examiner* — Ricky Ngo
*Assistant Examiner* — Richard K Chang
(74) *Attorney, Agent, or Firm* — Schubert Law Group PLLC

(57) ABSTRACT

Apparatuses, systems, and methods for transmitting data frames over data networks with varying Interframe Space (IFS) times are disclosed. A system embodiment may comprise a mobile computing device with an integrated wireless networking card. The card may receive a transmission of several data frames. While receiving the several data frames, the networking card may determine that a response will need to be transmitted back to the sending station after the sending station sends the last frame of data. After a short period of delay following the end of the last transmitted frame the card may immediately begin transmitting a preamble of the response, while still demodulating and processing data of the transmitted frames. Upon finishing data processing of the remaining frames, the card may generate the content for the rest of the response, such as a block acknowledgment.

16 Claims, 5 Drawing Sheets

VARIABLE SHORT INTERFRAME SPACE

FIELD

The embodiments herein are in the field of communications. More particularly, the embodiments relate to methods and apparatuses for transmitting data frames over data networks with varying Short Interframe Space (SIFS) times.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

Figure 1A:
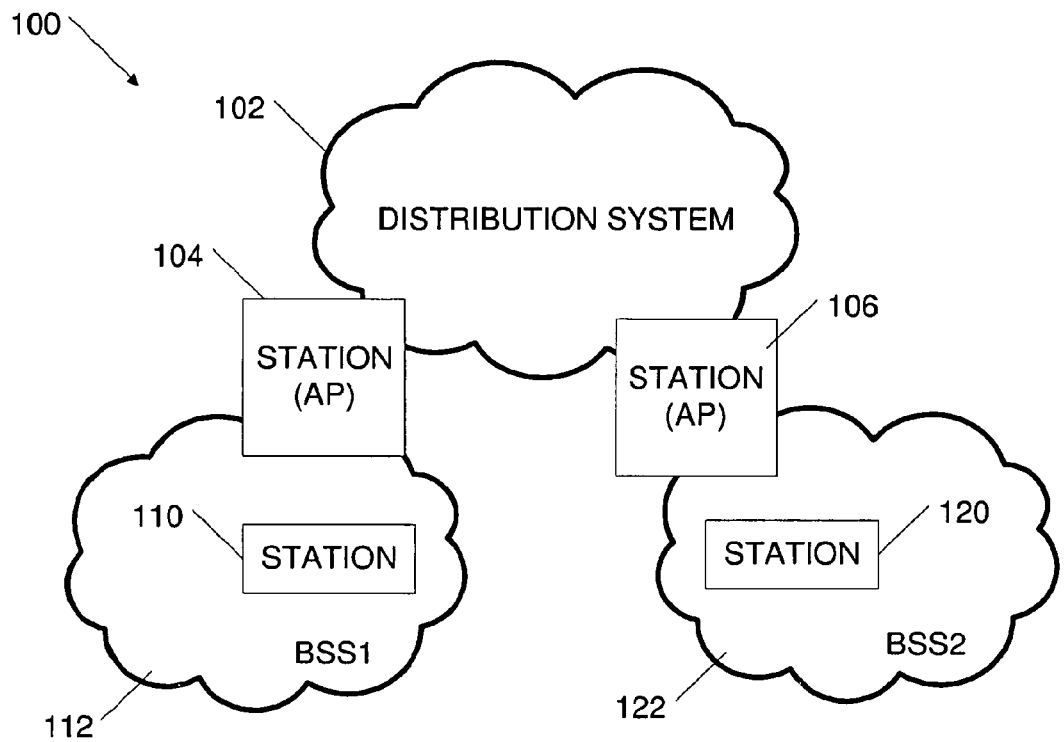
FIG. 1A depicts an embodiment of a wireless local area network (WLAN) which may employ variable SIFS times.

The following is a detailed description of embodiments depicted in the accompanying drawings. The specification is in such detail as to clearly communicate the embodiments. However, the amount of detail offered is not intended to limit the anticipated variations of embodiments. To the contrary, the intention is to cover all modifications, equivalents, and alternatives consistent with the spirit and scope of the embodiments as defined by the appended claims.

Electronic devices like personal computers, cellular telephones, personal digital assistants (PDAs) may employ Wireless Personal Area Network (WPAN) and Wireless Local Area Network (WLAN) standards in order to communicate with one another and with peripheral devices. Numerous standards define how WPANs and WLANs may be structured and operate. Example standards are the Bluetooth® (BT) 1.2, the Institute of Electrical and Electronic Engineers (IEEE) Std 802.15.3 and the IEEE 802.11 standards.

Generally speaking, methods, apparatuses, and systems that transmit data frames over data networks with varying interframe space (SIFS) times are contemplated. A system embodiment may be a mobile computing device with wireless communications capabilities, such as an integrated wireless networking card. The card of the mobile computing device may receive a transmission of several data frames. While receiving the several data frames, the networking card may demodulate and decode one or more of the data frames being received and determine that a response will need to be transmitted back to the sending station after the sending station sends the last frame of data. After a short period of delay following the end of the last transmitted frame the card may immediately begin transmitting a preamble of the response, while still demodulating and processing data of the transmitted frames. Upon finishing data processing of the remaining frames, the card may generate the content for the rest of the response. For example, the rest of the response may comprise a block acknowledgment.

A method embodiment may involve a station receiving data of an aggregate of multiple frames. For example, the aggregate may be transmitted via a 2.4 GHz, 5 GHz or 60 GHz wireless transmission from a sending station. While receiving the data of the aggregate, the station may determine to transfer the response related to reception of the data. The station may begin transmitting the response upon the completion of the transmission of the aggregate, before the station completes the media access control (MAC) processing of the modulated data of the aggregate.

An embodiment of an apparatus may comprise a receiver, a MAC module, and response module. The receiver may receive transmission of an aggregate of multiple data frames, with the receiver having a demodulator to demodulate data of the aggregate. The MAC module may process the modulated data of the receiver. The response module may generate a response to the transmission, with the response having a preamble and response content. The response module may be configured to generate the preamble as the MAC module processes the modulated data of the aggregate.

An alternative system embodiment may comprise a receiver, a processing module, and a transmitter. The receiver may be coupled to an antenna, configured to receive a plurality of data frames transmitted via a 2.4 GHz, 5 GHz or 60 GHz wireless network. The processing module may process the plurality of data frames and decide to transfer a response for the plurality. The processing module may be configured to make the decision to transfer the response while the receiver receives state of the plurality. The transmitter may transmit a first portion of the response while the processing module generates a second portion of the response.

Various embodiments disclosed herein may be used in a variety of applications. Some embodiments may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.16e, 802.20, 3 GPP Long Term Evolution (LTE) etc. and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), Code-Division Multiple Access (CDMA), Multi-Carrier Modulation (MDM), Discrete Multi-Tone (DMT), Bluetooth®, ZigBee™, or the like. Embodiments may be used in various other apparatuses, devices, systems and/or networks.

Turning now to the drawings, FIG. 1A depicts an embodiment of a wireless local area network (WLAN) which may employ variable SIFS times. For example, WLAN 100 may comprise a 60 gigahertz (GHz) WLAN. It should be appreciated that various types of local area networks for transmitting data to and receiving data from network stations may be employed in the various exemplary embodiments of this invention. For example, in an alternative embodiment, the WLAN may instead comprise an IEEE 802.11 network, a wireless personal area network (WPAN), a general packet radio service (GPRS) network, a global system for mobile communication (GSM) network, a code division multiple access (CDMA) network, a Bluetooth® network, or other suitable wireless network.

As shown in FIG. 1A, the wireless local area network 100 includes a distribution system 102, stations 104 and 110 provided in a first basic service set (BSS) 112 having the same basic service, and stations 106 and 120 provided in a second basic service set BSS 122 having the same basic service. For example, stations 110 and 104 may comprise network stations provided within a cell under a common coordinating function, with one of the stations providing access to the distribution system 102 being an access point (AP) to a basic service set. Similarly, stations 106 and 120 may comprise network stations provided within a cell under a common coordinating function, with one of the stations providing access to the distribution system 102 being an access point (AP) to a second basic service set. Stations 104, 110, 106, and 120 together with the distribution system 102 may form an extended service set (ESS), where all stations may communicate with each other without involving entities outside of the 802.11 media access control (MAC) architecture. It should be appreciated that any of the stations of WLAN 100 that are not access points may comprise mobile network stations.

Further, it should be appreciated that the stations 104, 110, 106, and 120 may be connected to other devices and/or networks with which the stations may communicate. For example, BSS 112 and/or BSS 122 may comprise peripheral devices and additional networking devices in alternative embodiments. Furthermore, though FIG. 1A only shows four stations within WLAN 100, it should be appreciated that an alternative embodiment may include more than four stations. That is, it should be appreciated that BSS 112 and BSS 122 may each include more than two stations in alternative embodiments. One or more of the stations in BSS 112 and/or BSS 122 may employ variable SIFS times to improve the performance of WLAN 100.

As shown in FIG. 1A, stations 104 and 106 are also access points (AP) that provide access to the distribution system 102 by the basic service sets, BSS 112 and BSS 122, respectively. The distribution system 102 enables mobile network station support to the mobile network stations 110 and 120 by providing the logical services necessary to handle address to destination mapping and seamless integration of multiple basic service sets. Data may move between the basic service sets, BSS 112 and BSS 122, and the distribution system 102 via the access points. In accordance with these embodiments, because the access points are also stations (104 and 106), they are addressable entities. It should be appreciated that though FIG. 1A shows basic service sets BSS 112 and BSS 122 as two separate sets, in accordance with various exemplary embodiments, the basic service sets may partially overlap, be physically disjointed, or be physically collocated.

As shown in FIG. 1A, to send data from station 110 to station 120, for example, the data may be sent from station 110 to station 104, which is the input access point for basic service set BSS 112 to the distribution system 102. Station 104, as an access point, may transfer the data to the distribution service of the distribution system 102 with variable SIFS times. The distribution service may then deliver the message within the distribution system 102 in such a way that the data arrives at the appropriate distribution system destination for the intended station, station 120. In the embodiment of FIG. 1A, the data may be distributed by the distribution service to station 106, which is the output access point for basic service set BSS 122, and station 106 accesses a wireless medium to send the data to the intended destination, station 120. In transferring the data from station 110 to station 120, each of the stations may employ varying amounts of SIFS time.

Figure 1B:
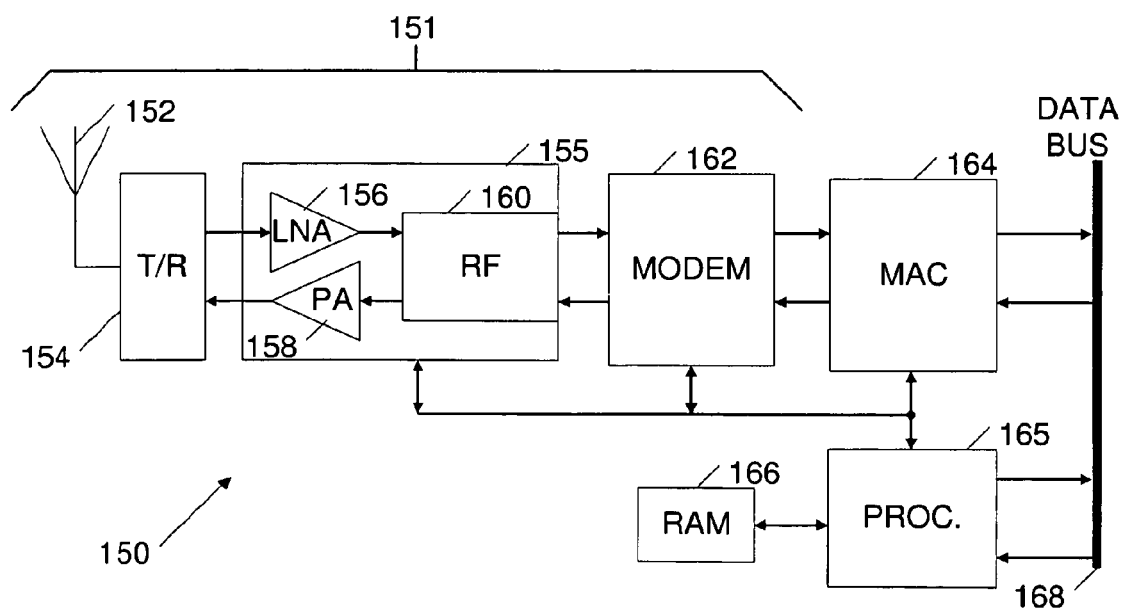
FIG. 1B shows a wireless communication system that may transfer data with variable SIFS times via a WLAN.

FIG. 1B shows a wireless communication system 150 that may transfer data with variable SIFS times via a WLAN or WPAN. For example, wireless communication system 150 may comprise station 110, 104, 106, or 120, depicted in FIG. 1A. In some embodiments wireless communication system 150 may comprise part of a computer system, such as wireless access card of a notebook or a desktop computer. In other embodiments, wireless communication system 150 may comprise a networking device, such as a router that has an integrated access point. In even further embodiments wireless communication system 150 may comprise part of a different type of computing apparatus, such as a palmtop computer, a personal digital assistant (PDA), or a mobile computing device, as examples. As will be illustrated, wireless communication system 150 may employ SIFS in a manner that permits a shorter Interframe space under various usage scenarios for improved performance.

Wireless communication system 150 includes a physical layer interface (PHY) 151 that includes at least one antenna 152 for 60 GHz carrier service, a transmit/receive (T/R) switch 154 for half-duplex operation, and a wireless transceiver 155 that includes a low-noise amplifier (LNA) 156, a power amplifier (PA) 158, and other radio frequency (RF) transceiver components 160 not shown. The physical layer also includes a data modem 162. Wireless communication system 150 further includes a media access controller (MAC) 164 for layer-2 processing. A computer system databus 168 is accommodated. Interfaces may be included e.g., one or more interfaces that conform to industry-standard Personal Computer Memory Card International Association (PCMCIA), peripheral component interconnect (PCI), universal serial bus (USB), and so forth.

The embodiment of FIG. 1B comprises a processor 165. Some embodiments may not specifically comprise a separate processor 165. For example, in one or more embodiments, the host processor function may be incorporated into MAC 164. A random access memory (RAM) 166 is included for data buffering and program storage. RAM 166 may be directly coupled to processor 165, to MAC 164, or to both.

In addition to the radio data between modem 162, transceiver 155, and MAC 164, control information such as gain settings for the radio receiver from an automatic gain control module in modem 162, and other data, may be communicated between processor 165 (if included), MAC 164, modem 162, and wireless transceiver 155.

Wireless communication system 150 may be compatible with various IEEE-802.11 standards for WLAN applications. RF transceiver 160 and modem 162 may constitute a wireless engine for OSI Layer-1 physical layer (PHY) functionality in broadband wireless LANs. MAC 164 may be IEEE-802.11-compliant for layer-2 processing. Wireless communication system 150 may transmit and receive packets and/or frames of data with varying amounts of SIFS time via the PHY 151 and MAC 164 processing functions performed while wireless communication system 150 communicates with one or more network devices. For example, PHY 151 and/or MAC 164 may be configured to receive frames of data with varying amounts of SIFS time. Similarly, PHY 151 and/or MAC 164 may be configured to transmit responses, such as acknowledgments for frames of data received, with variable amounts of SIFS time.

Many alternative embodiments of wireless communication system 150 may comprise additional components, while other alternative embodiments of wireless communication system 150 may comprise fewer components. For example, many embodiments of wireless communication system 150 may comprise a memory controller hub (MCH) and an I/O controller hub (ICH). In some embodiments, processor 165 may have one or more cores coupled with cache and one or more memory elements. The types of memory elements may vary in different embodiments. In some embodiments, the memory may comprise volatile memory elements, such as two 1-gigabyte (GB) dynamic random access memory (DRAM) sticks. In other embodiments, the memory may comprise nonvolatile memory. For example in some embodiments the memory may comprise a flash memory module, such as a 4 GB flash memory card.

In some embodiments, wireless communication system 150 may interact with external peripheral devices, such as keyboards, scanners, and data storage devices. Various embodiments of wireless communication system 150 may present information to a user via a display device. Various embodiments of wireless communication system 150 may also interact with Advanced Technology Attachment (ATA) devices, such as ATA hard drives, compact disc (CD) drives, and digital versatile disc (DVD) drives.

In some embodiments, configuration software and/or the operating system of wireless communication system 150 may have a selectable parameter which enables or disables the variable SIFS time depending on such conditions as network traffic, system operating conditions, or hardware compatibility, as examples. For example, when installing a communication card comprising the elements of wireless communication system 150 into a desktop computer, a user may execute configuration software which installs drivers and other low-level software that enables the communication card to interact with the operating system and/or hardware of the desktop computer. During execution of the configuration software, the use may enable an option which causes wireless communication system 150 to use a fixed period of time for SIFS during periods when the network traffic is relatively low. Alternatively, the configuration software may permit the user to completely disable the variable SIFS feature, which may be necessary if a variable SIFS time were to have an incompatibility issue with one or more devices in the local network.

Figure 2A:
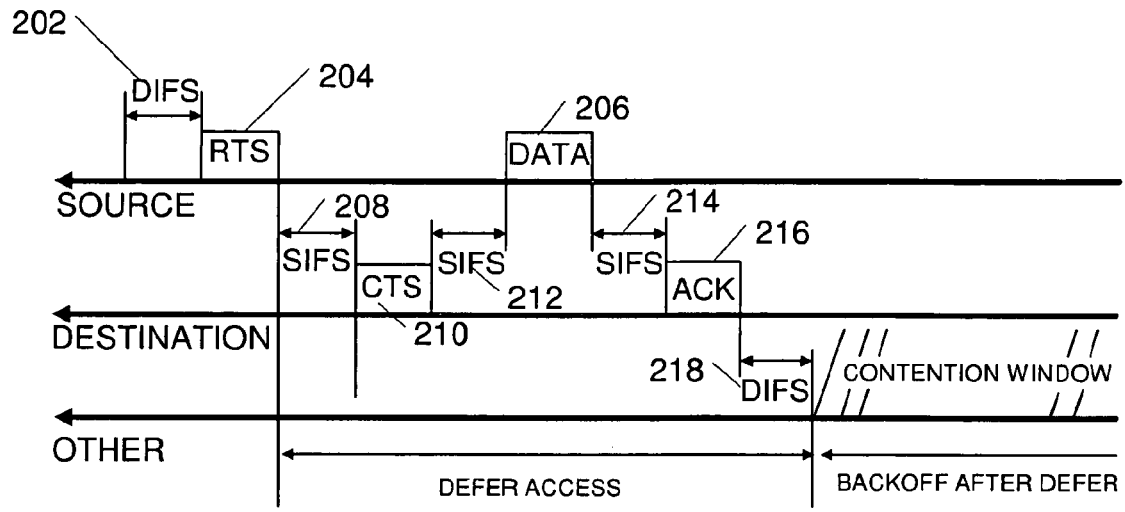
FIG. 2A shows a method to exchange control information when transmitting data with different periods of Interframe Space.

FIG. 2A shows detailed operation of a method to exchange control information when transmitting data from a transmitting station to a receiving station, which illustrates different periods of Interframe Space. For example, a station of FIG. 1A or wireless communication system 150 may perform part of the method described by FIG. 2A when transmitting and/or receiving data via a LAN.

As shown in FIG. 2A, a source station may transmit control information comprising a request-to-send signal (RTS) 204, which enables the source station to determine whether a destination or receiving station is available to receive data. The receiving station may respond to the RTS 204 by transmitting control information in the form of a clear-to-send signal (CTS) 210. The transmitting station may send data 206 after the receiving station sends the clear-to-send signal (CTS) 210. In response to receiving data 206, the receiving station may transmit control information in the form of an acknowledgment signal (ACK) 216 to acknowledge reception of data 206. Subsequent data is subjected to a succeeding procedure started by another station after confirming termination of the transmission procedure between the transmitting and receiving stations, as acknowledged by ACK 216 from the receiving station.

As illustrated in FIG. 2A, time intervals such as inter-frame spaces are provided between frames. A station determines that the medium is idle through the use of the virtual carrier detection to determine availability of a medium for transmission for the interval specified. As illustrated in FIG. 2A, the inter-frame spaces may include short inter-frame spaces (SIFS), point coordination function (PCF) inter-frame spaces (PIFS), and distributed coordination function (DCF) inter-frame spaces (DIFS).

As shown in FIG. 2A, SIFSs are used as gaps between exchange procedures. For example, as shown in FIG. 2A, the SIFS 208, SIFS 212, and SIFS 214 are used respectively as gaps between the request-to-send (RTS) frame 204, the clear-to-send (CTS) frame 210, the data frame 206, and the acknowledgment (ACK) frame 216. A short inter-frame space (SIFS) may indicate the time from the end of the last symbol of the previous frame to the beginning of the first symbol of the preamble of the subsequent frame as seen at a receiving interface. Of the various IFS periods, the SIFS comprises the shortest period of the inter-frame spaces and is used when stations have seized the medium and need to continue using the medium for the duration of a frame exchange sequence. Using the SIFS gap between transmissions within the frame exchange sequence prevents other stations, which are required to wait for the medium to be idle for a longer period, from attempting to use the medium, thus giving priority to completion of the frame exchange sequence in progress.

As shown in FIG. 2A, DCF inter-frame spaces (DIFS) are used by stations operation under the distributed coordination function (DCF) to transmit data frames and management frames. A station using the distributed coordination function (DCF) transmits a data frame if the virtual carrier detection mechanism determines that the medium is idle. As shown in FIG. 2A, at a starting point of the exchange procedure from a transmitting station to a receiving station, DCF inter-frame space (DIFS) 202 is used to confirm availability (channel occupation status) of the medium for transmission of the request-to-send signal (RTS) 204. Further, as shown in FIG. 2A, after data 206 has been delivered, the supplemental DCF inter-frame space (DIFS) 218 period elapses, and the station performs a backoff procedure.

Figure 2B:
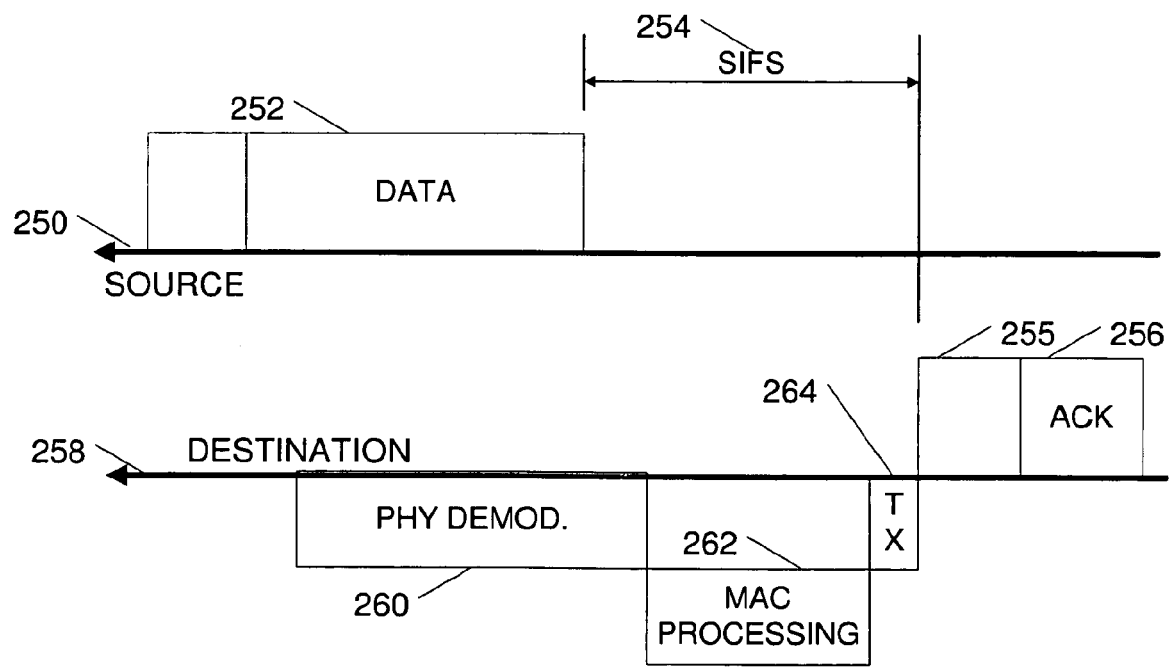
FIG. 2B illustrates some of the functions a receiving station may perform during an SIFS time.

FIG. 2B illustrates in greater detail some of the functions a receiving (destination) station 258 may perform during an SIFS time 254. For example, FIG. 2B illustrates some of the functions that PHY 151 and MAC 164 of FIG. 1B may perform. For prior art implementations, SIFS time 254 is defined as a fixed gap of time between frames. In other words, prior art implementations treat SIFS time 254 as a fixed value that cannot be shortened. Example fixed values of SIFS time 254 are 10 microseconds (μs) for physical layers employing direct sequence spread spectrum (DSSS) or infrared (IR), 16 μs for physical layers employing orthogonal frequency division multiplexing (OFDM), and 28 μs for physical layers employing frequency-hopping spread spectrum (FHSS). For different embodiments, however, the duration of SIFS time 254 may actually be made to vary instead of being a fixed amount time. How SIFS time 254 may vary will be described later with reference to FIG. 3.

FIG. 2B further illustrates how transmitting station 250 may transmit data frame 252 to receiving station 258, in response to which receiving station 248 may transmit a response (ACK 256). Receiving station 258 may demodulate and decode data frame 252 in the PHY layer (element 260), which introduces some latency. The MAC layer parses the demodulated frame data and determines that a response is required (element 262). Upon determining that a response is required, receiving station 258 switches to transmit mode (element 264) where the preamble 255 is played out followed by the response frame itself (ACK 256). In examining the interaction of FIG. 2B, one may see that the gap for SIFS time 254 needs to be large enough that receiving station 258 has sufficient time to decode at least a portion of received frame (right-most portion of element 260), determine if a response is required (element 262), and switch to transmit mode (element 264) before beginning to transmit the response (elements 255 and 256).

To improve performance in a network, a station or network communication device may employ a SIFS period as a range, having an upper-bound and a lower-bound, instead of a fixed value. For example, instead of a fixed value like 10 μs, the SIFS period may be defined as the period of time falling somewhere between the lower-bound value, which may be referred to as "SIFSmin", and the upper-bound value, which may be referred to as "SIFSmax". In other words, the gap between a transmitted frame and another frame transmitted in response to that frame may be permitted to vary within the range defined by SIFSmin and SIFSmax.

Specifically, SIFSmin may be defined as an amount of time a reasonable implementation needs to switch from transmit mode to receive mode in order to receive a response frame. The gap between a transmitted frame and the corresponding response may not be shorter than this value. For example, SIFSmin may be set equal to 0.5 μs, which may correspond to the amount of time the source station of FIG. 2A needs to switch from transmit mode to receive mode. More specifically, the SIFSmin value for SIFS 214 may equal 0.5 μs, enabling the source station to switch from transmit mode to receive mode after transmitting DATA 206 in order to receive ACK 216 from the destination station.

SIFSmax may be defined as the maximum amount of time a reasonable implementation may need to respond to a transmitted frame. The SIFSmax value may be set at an appropriate value, taking into consideration various worst-case scenarios. For example, SIFSmax may be set to 8 μs, which may be the amount of time that the destination receiver in FIG. 2A requires in order to receive a short data frame and respond with an acknowledgement. The gap between the end of a transmitted frame and the beginning of a response frame must be less than or equal to this value.

In many embodiments, the SIFSmin and SIFSmax values will be fixed, such that a station may respond within the range defined by the upper and lower-range values. In an alternative embodiment, two stations may negotiate values for the range values, and respond within the agreed upon range when communicating with each other.

Figure 3:
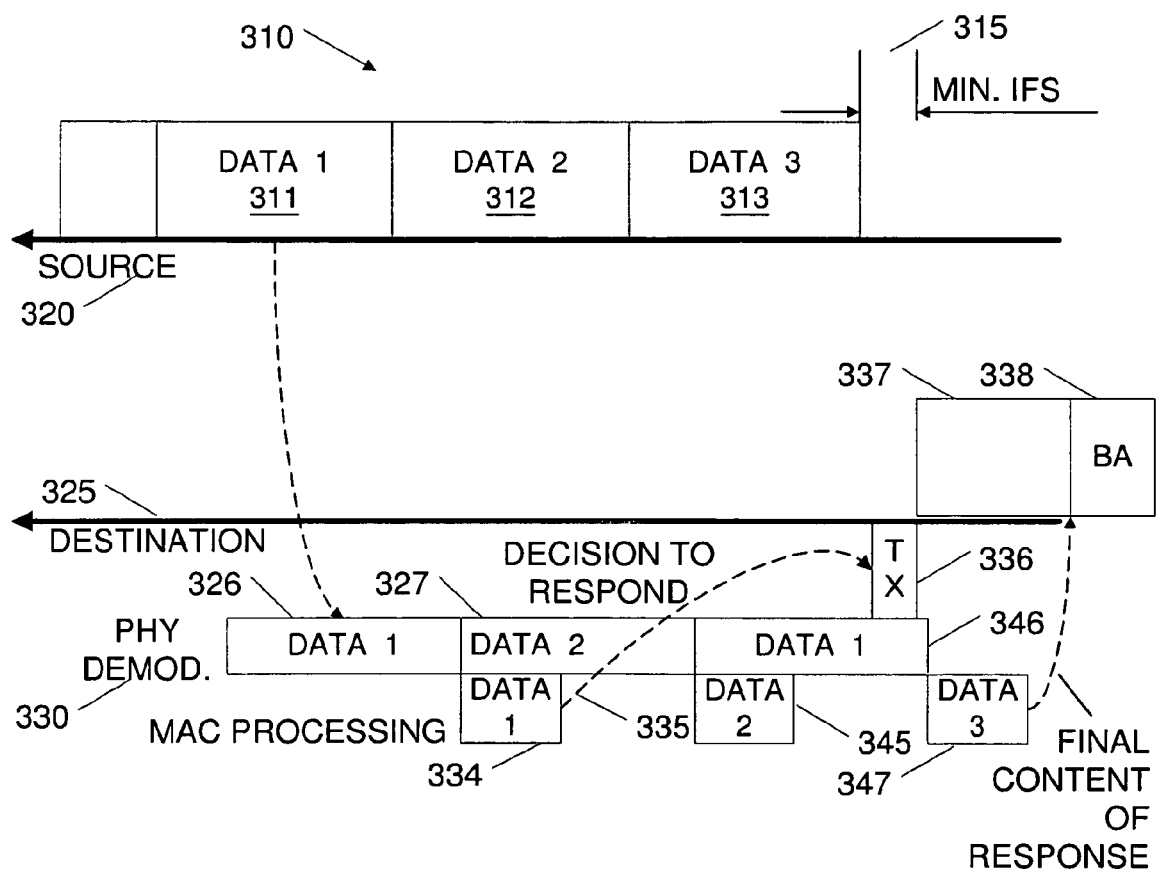
FIG. 3 illustrates how stations may improve performance of a network by employing variable SIFS times.

FIG. 3 illustrates how stations may improve performance of a network by employing variable SIFS times. FIG. 3 depicts a data transmission and response usage scenario. Transmitted frame 310 is an aggregate comprising multiple data frames (elements 311, 312, and 313). Upon receiving at least a portion of the data of data frame 311, destination station 325 performs the PHY demodulation (element 330) for the sequence of individual data frames of aggregate frame 310, as the individual frames are received.

After demodulation, and after the MAC layer of destination station 325 processes the first data frame 311 (element 334), destination station 325 can make a decision (element 335) to transmit a response frame (elements 337 and 338). The PHY layer can be instructed to begin transmitting the response as soon as the current frame has been received completely. For example, after source station 320 transmits the last data frame 313 of aggregate frame 310, destination station 325 may switch from receive mode to transmit mode (element 336). In the meantime, station 325 may demodulate the remainder of the frame (element 346) and process the demodulated remainder by the MAC (element 347).

For the period of time SIFSmin (element 315) following the end of the frame, the RF front end may switch to transmit mode (element 336) and the PHY may begin playing out the preamble (element 337). In the 60 GHz band, the preamble is approximately 2 μs in duration. Again for emphasis, during the IFS (element 315) and while the preamble is being played out (element 337) the PHY demodulates the remainder of the received frame (element 346) and the MAC processes the remainder of any individual data frames (element 347).

The duration of the delay period, after data frame 313 is transmitted but before preamble 337 is transmitted, may vary from embodiment to embodiment, as well as varying for each embodiment depending on the number of data frames of the aggregate. For example, in some embodiments, the hardware of source station 320 and destination station 325 may be relatively fast, enabling each station to switch between transmit/receive modes in a rapid manner. The quicker source station 320 and destination station 325 may switch between transmit/receive modes, the smaller the duration of the period of time SIFSmin (element 315) may be made.

In some alternative embodiments, the period of time SIFSmin (element 315) may be made extremely small. For example, source station 320 and destination station 325 may each comprise separate receivers and transmitters, as well as separate antennas, wherein the receivers and transmitters may operate simultaneously, such as by operating at different frequencies and/or using different modulation methods. Such a configuration may allow destination station 325 to begin transmitting the response immediately after source station 300 completes transmission of data frame 313, or shortly thereafter.

In regard to the duration of the SIFS time varying based on the number of data frames of the aggregate, one may consider Table 1 with reference to FIG. 3. If only one data frame is transmitted in the aggregate, destination station 325 incurs a delay demodulating and MAC processing the frame. If destination station 325 needs to transmit a response, destination station 325 may not be able to respond sooner than 2 μs, as an example, which may correspond to the scenario illustrated in FIG. 2B. However, if multiple data frames are transmitted, the period of time SIFSmin (element 315) may be made smaller, e.g. by reducing the period to 0.3 μs.

After the MAC makes the decision to transmit a response following the receipt and processing of the first data frame (element 334), the MAC may start preparing the block acknowledgment (BA) frame response (element 338). Preparing the BA frame response may involve, among other things, setting the bitmap for data frames successfully received. When destination station 325 receives the final data frame 313, the MAC may set the final bit in the bitmap, upon which the BA frame may then be ready to be transmitted. By design for many embodiments, setting the final bit in the bitmap may occur before the preamble has been completely transmitted so that the complete BA frame is ready for transmission at the end of the preamble.

Various embodiments may appreciably improve performance in numerous data transfer scenarios. For example, various embodiments may be effective with bus or I/O traffic where aggregate transmissions are short and have frequent radio turnarounds to keep latency low. Table 1 illustrates how some embodiments may improve performance. With a PHY data rate of 3.8 Gbps and various sized aggregates, Table 1 illustrates what may be MAC efficiency with a fixed SIFS of 2 μs, versus MAC efficiency with a variable SIFS.

TABLE 1

Example MAC performance with and without variable SIFS

| Aggregate size | Efficiency with variable SIFS | Efficiency with SIFS = 2 μs |
|---|---|---|
| 1 × 1500B | 27% | 27% |
| 2 × 1500B | 49% | 44% |
| 3 × 1500B | 59% | 54% |
| 4 × 1500B | 65% | 61% |

For the data transfer scenarios illustrated in Table 1, the following sequence is assumed to be repeated:

preamble/data aggregate+SIFS+preamble/BA+SIFS+ .

The values of Table 1 are generated based on the assumption that the SIFS period, between the end of the data aggregate transmission and the beginning of the transmission for the BA response, is reduced to 0.5 μs when there are two or more data frames in the data aggregate. When there is one data frame in the aggregate, as well as when the SIFS is between the end of the BA and the next data aggregate, the SIFS is assumed to be 2 μs. Also, for the values depicted in Table 1, the preamble duration is assumed to be 2 uS in all cases. As Table 1 illustrates, protocol overhead may be significantly reduced with shorter SIFS times between the data aggregate and the BA. Embodiments may exhibit diminishing returns as the data aggregate gets longer, but the embodiments may nonetheless be able provide some gain.

Figure 4:
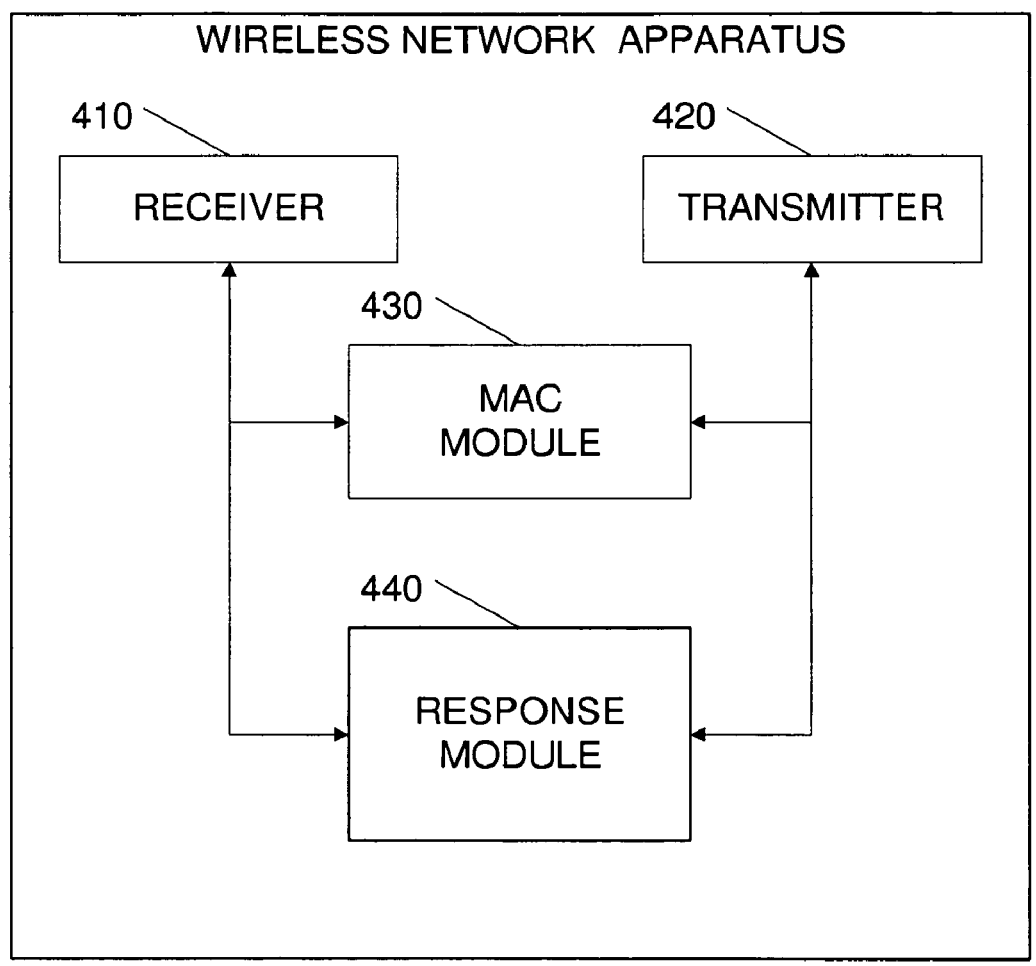
FIG. 4 depicts one embodiment of an apparatus that may transmit responses with varying IFS times.

FIG. 4 depicts one embodiment of an apparatus 400 that may transmit responses to transmitted data frames over wireless networks with varying Interframe Space (IFS) times. For example, apparatus 400 may comprise, or at least form a part of, a wireless network communication device, such as a station, an access point, or a router with an integrated wireless access point. One or more elements of apparatus 400 may be in the form of hardware, software, or a combination of both hardware and software. For example, in the embodiment depicted in FIG. 4, one or more portions of media access control (MAC) module 430 and/or response module 440 may comprise instruction-coded modules stored in one or more memory devices. For example, the modules may comprise software or firmware instructions of a wireless communication application, executed by one or more processors, to perform functions related to receiving and transmitting data frames over a wireless network, such as modulating and the modulating, encrypting and decrypting, encoding and decoding, and making decisions based on information of the data frames.

In alternative embodiments, one or more of the modules of apparatus 400 may comprise hardware-only modules. For example, receiver 410, transmitter 420, MAC module 430, and response module 440 may each comprise a portion of an integrated circuit chip. In such embodiments, one or more of the modules may comprise such hardware elements as resistors, capacitors, inductors, diodes, CMOS transistors, analog transistors, combinations of logic gates, and state machines.

In even further alternative embodiments, one or more of the modules of apparatus 400 may comprise a combination of hardware and software modules. For example, MAC module 430 may comprise firmware-encoded instructions executed by a processor, when the processor works in conjunction with a state machine which receives demodulated and decoded data from receiver 410, performs one or more processing operations on the data, and places the processed data into content-addressable memory. Upon placing the data into the content-addressable memory, response module 440 may examine the processed data, and make one or more decisions regarding the disposition of the processed data, such as generating an acknowledgment and/or preparing the data for forwarding to another network communications device.

Receiver 410 may receive a transmission of an aggregate of multiple data frames. By way of example with reference to FIGS. 1B & 3, receiver 410 may comprise antenna 152, transmit/receive switch 154, transceiver 155, and modem 162. Receiver 410 may comprise the destination station 325 in FIG. 3, which receives data frames 311, 312, and 313 transmitted from source station 320. Data frames 311, 312, and 313 may comprise the aggregate of multiple data frames. Upon receiving data of the aggregate, receiver 410 may demodulate data of the aggregate and transfer the demodulated data to MAC module 430 for further processing.

MAC module 430 may process the demodulated data transferred from receiver 410. Again referencing FIG. 3 as a example, MAC module 430 may receive the data of data frame 311 after the data has been demodulated at the PHY layer (element 326) and perform one or more processing operations on the demodulated data (element 334). As FIG. 3 illustrates, MAC module 430 is configured to process demodulated data while the demodulator of the PHY layer demodulates other data. In other words, MAC module 430 is configured to perform one or more processing operations on the demodulated data (element 334) at the same time the PHY layer demodulates data (element 327) for data of data frame 312.

Response module 440 may generate a response to the transmission of the aggregate. For example, the response may comprise preamble 337 and response content, such as content of block acknowledgment (BA) 338. As FIG. 3 further illustrates, response module 440 may be configured to generate data for preamble 337 at the same time MAC module 430 performs one or more processing operations on demodulated data of the aggregate (elements 345 and 347).

Worth emphasizing for clarity, the position of preamble 337 in FIG. 3 illustrates that a destination station 325 may transmit preamble 337 back to source station 320 after an IFS time. The actual generation of the data for preamble 337 may occur approximately at the same time preamble 337 is transmitted, which would overlap the MAC processing of data from data frame 313 (element 347). Alternatively, generation of the data for preamble 337 may occur before the time preamble 337 is transmitted, which may overlap the MAC processing of data from data frame 312 (element 345). Even though the content or data for a preamble may be generated at various times, response module 440 may be configured to generate the content for preamble 337 while the demodulator demodulates data of the aggregate (elements 327 and 346).

Response module 440 may be configured to generate data or content for the response content after the MAC module processes a final frame of the multiple data frames. For example, response module 440 may generate a portion or all of block acknowledge (BA) 338 after the MAC processing of data from data frame 313 (element 347). Once response module 440 generates BA 338 for the response, response module 440 may enable transmitter 420 to transmit the portion of BA 338 of the response back to source station 320 following transmission of the preamble 337. Transmitter 420 may comprise, for example, an encoder, a modulator, a power amplifier, and other RF components which enable transmission of the response back to source station 320.

The number of modules in an embodiment of apparatus 400 may vary. Some embodiments may have fewer modules than those module depicted in FIG. 4. For example, one embodiment may integrate MAC module 430 with response module 440 into a single module. Further embodiments may include more modules or elements than the ones shown in FIG. 4. For example, alternative embodiments may include two or more receivers 410 and/or transmitters 420, multiple response modules 440, and/or multiple MAC modules 430.

In various alternative embodiments, transmitter 420 and receiver 410 may comprise a transceiver coupled to a single antenna. In at least some of these alternative embodiments, response module 440 may be configured to switch apparatus 400 from a receive mode to a transmit mode upon completion of the transmission of the aggregate. In other alternative embodiments, receiver 410 and/or transmitter 420 may each have multiple antennas. For example, transmitter 420 may be coupled to two transmission antennas, while receiver 410 may be coupled to two reception antennas.

In another embodiment, response module 440 may comprises a processor coupled to MAC module 430, which may enable MAC module 430 to process the demodulated data. For example, FIG. 1B shows how MAC 164 may be coupled with processor 165. Further, in additional alternative embodiments, the processor may be coupled to a modulator and dynamic random access memory (DRAM). Again referring to FIG. 1B, processor 165 is coupled to modem 162 and RAM 166.

Figure 5:
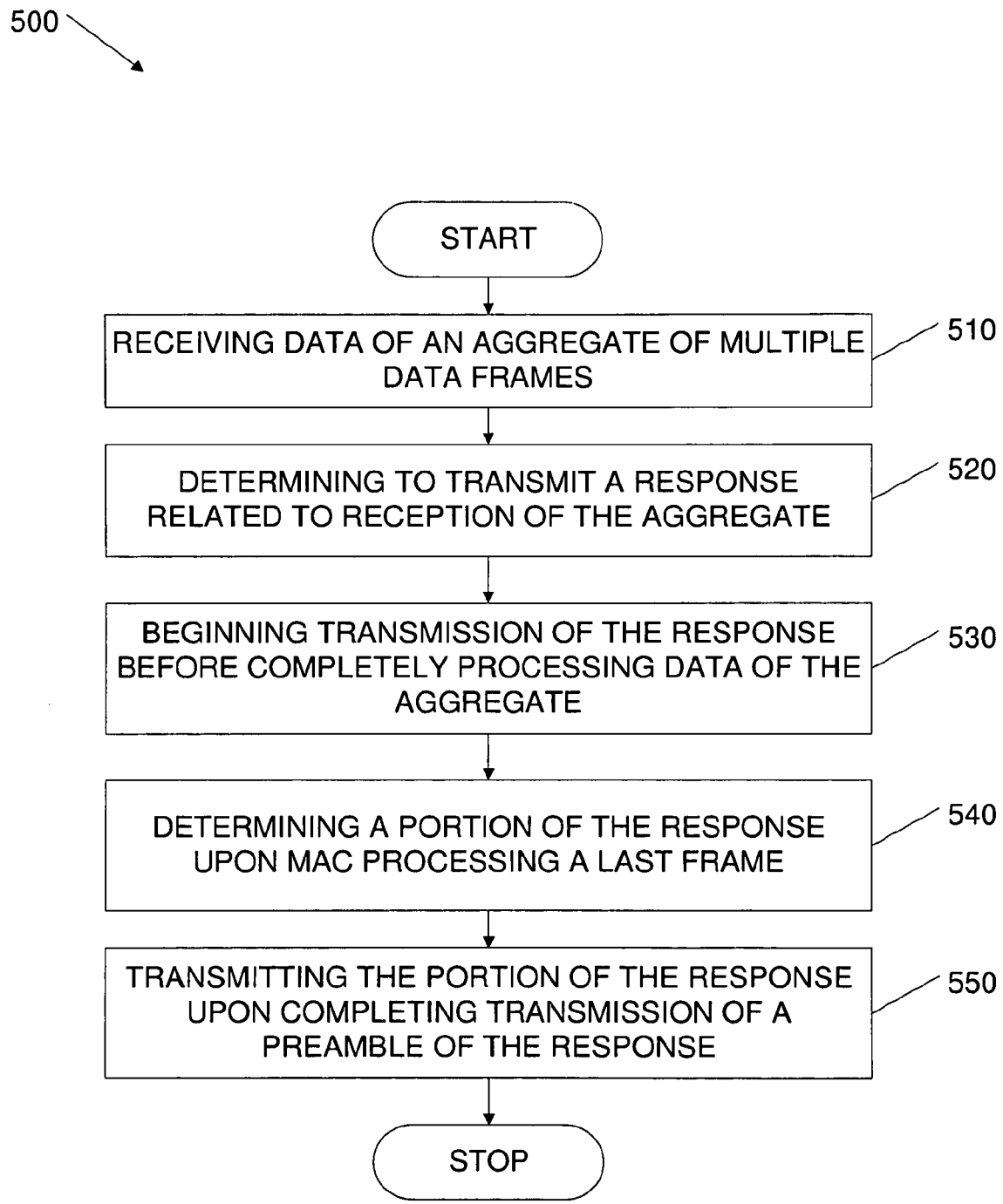
FIG. 5 illustrates a method for transmitting responses to transmitted data frames over wireless networks with varying IFS times.

FIG. 5 depicts a flowchart 500 illustrating a method for transmitting responses to transmitted data frames over wireless networks with varying Interframe Space (IFS) times. Flowchart 500 begins with receiving data of an aggregate of multiple data frames (element 510). For example, station 120 of FIG. 1A may receive an aggregate of four data frames from station 106, similar to the aggregate (element 310) of FIG. 3.

Upon receiving data of the aggregate (element 510), an embodiment according to flowchart 500 may continue by determining to transmit a response related to reception of the aggregate (element 520). Continuing with the previous example, station 120 may demodulate and decode data of the first data frame of the aggregate. Once station 120 demodulates and decodes data of the first data frame, station 120 may perform one or more MAC processing operations on the demodulated/decoded data. Upon performing such MAC operations, station 120 may recognize the need to transmit a response, such as a block acknowledge, back to station 106.

Station 120 may begin transmitting the response before completely processing the rest of the data of the aggregate (element 530). For example, station 120 may start transmitting the preamble of the response 0.6 µs after station 106 completes the transmission of the fourth data frame. During the time that station 120 is transmitting the preamble back to station 106, station 120 may finish demodulating, decoding, and MAC processing data of the fourth data frame, enabling station 120 to generate a portion or all of the final content of the response (element 540), which comprises the block acknowledgment in this scenario. Once station 120 has generated the final content of the response, station 120 may transmit the final content after transmitting the preamble (element 550).

As noted earlier in the discussions related to FIG. 1B and FIG. 4, one or more portions of some embodiments may be implemented as a program product stored in a tangible medium for use with a process to perform operations for processes, such as the processes described in conjunction with apparatus 400 illustrated in FIG. 4. The program(s) of the program product defines functions of the embodiments (including the methods described herein) and may be contained on a variety of data-bearing media. Illustrative data-bearing media include, but are not limited to: (i) information permanently stored on non-writable storage media (e.g., read-only memory devices within a station); and (ii) alterable information stored on writable storage media (e.g., flash memory). Such data-bearing media, when carrying computer-readable instructions that direct the functions of devices or systems, represent elements of some embodiments of the present invention.

In general, the routines executed to implement the embodiments, may be part of an operating system or a specific application, component, program, module, object, or sequence of instructions. The computer program of an embodiment may be comprised of a multitude of instructions that will be translated by a computer into a machine-readable format and hence executable instructions. Also, programs may be comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus a specific embodiment should not be limited to use solely in any specific application identified and/or implied by such nomenclature.

It will be apparent to those skilled in the art having the benefit of this disclosure that the embodiments herein contemplate systems, apparatuses, and methods for transmitting responses to transmitted data frames over wireless networks with varying Interframe Space (IFS) times. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. An apparatus, comprising:
a receiver to receive a transmission of an aggregate of multiple data frames, wherein the receiver comprises a demodulator to demodulate data of the aggregate;
a media access control (MAC) module to process demodulated data of the receiver;
a response module to generate a response to the transmission of the aggregate, wherein the response comprises a preamble and response content, wherein further the response module is configured to generate the preamble as the MAC module processes demodulated data of the aggregate; and
a transmitter to transmit the response, wherein the transmitter is configured to begin transmitting the response before the MAC module completes processing the demodulated data of the aggregate;
wherein the response module is to negotiate with the transmitter of the aggregate of multiple data frames on an SIFSmin value and on an SIFSmax value; and
the transmitter is to begin transmitting the preamble at an interval of a short interframe space (SIFS) after the receipt of the transmission of the aggregate of multiple data frames, the SIFS interval to vary between the SIFSmin value and the SIFSmax value.

2. The apparatus of claim 1, wherein the response content comprises a portion of a block acknowledge (BA).

3. The apparatus of claim 1, wherein the response module is configured to begin transmitting the preamble at an interval of a short interframe space (SIFS) after the receipt of the transmission of the aggregate of multiple data frames; wherein the SIFS interval is to vary between fixed values of SIFSmin and SIFSmax.

4. The apparatus of claim 3, wherein SIFS min equals 0.3 μs and SIFSmax equals 2 μs.

5. A method, comprising:
receiving a first wireless transmission at a time associated with the first wireless transmission; and
beginning, by a station, a second wireless transmission at an interval of time subsequent to the time associated with the first wireless transmission, the second wireless transmission and the interval of time pursuant to a communications protocol, wherein:
the communications protocol provides for a variable interframe space (IFS) between wireless transmissions, with the variable IFS bounded by a maximum IFS; and
the interval of time between the second wireless transmission and the first wireless transmission is less than the maximum IFS;
the communications protocol provides for a minimum IFS; and
the being nine comprises the station beginning the second wireless transmission, pursuant to the communications protocol, at the interval of time subsequent to the first wireless transmission, the interval of time greater than or equal to the minimum IFS;
the station negotiating with another station on a value for the minimum IFS and a value for the maximum IFS; and
the being nine comprises the station beginning the second wireless transmission at the interval of time subsequent to the first wireless transmission, wherein the interval of time is greater than or equal to the negotiated minimum IFS and less than the negotiated maximum IFS.

6. The method of claim 5, wherein:
the minimum IFS and maximum IFS comprise a fixed minimum IFS and a fixed maximum IFS as provided by the communications protocol; and
the beginning comprises the station, pursuant to the communications protocol, beginning the second wireless transmission at the interval of time subsequent to the first wireless transmission, the interval of time greater than or equal to the fixed minimum IFS and less than the fixed maximum IFS.

7. The method of claim 5, wherein the negotiating comprises the station negotiating with the other station on the value for the minimum IFS and the value for the maximum IFS, the values based upon one or more of the following factors:
the number of frames in the first wireless transmission, the first wireless transmission comprising an aggregate of multiple data frames;
the speed of hardware of the station and the other station in switching from transmit mode to receive mode and from receive mode to transmit mode; and
whether the station comprises a separate receiver and a separate transmitter.

8. The method of claim 5, wherein:
the first wireless transmission comprises an aggregate of multiple data frames;
the second wireless transmission comprises a block acknowledgement (BA) of the first wireless transmission;
the IFS comprises a short interframe space;
the maximum IFS comprises a maximum short IFS; and
the beginning comprises beginning, by the station, the second wireless transmission at the interval of time subsequent to the first wireless transmission, wherein the interval of time between the second wireless transmission and the first wireless transmission is less than the maximum short IFS.

9. The method of claim 5, the method further comprising:
the station disabling the variable IFS;
the station selecting a fixed IFS; and
the station beginning a fourth wireless transmission, pursuant to the communications protocol, at the interval of time subsequent to a third wireless transmission, the interval of time based upon the fixed IFS.

10. The method of claim 5, wherein:
the first wireless transmission comprises an aggregate of multiple data frames; and
the beginning comprises beginning, by the station, the second wireless transmission before a media access control module of the station completes processing of demodulated data of the first wireless transmission.

11. The method of claim 8, wherein:
the communications protocol provides for a minimum short IFS equal to 0.3 μs;
the communications protocol provides for the maximum short IFS equal to 2 μs;
and the beginning comprises beginning, by the station, the second wireless transmission at the interval of time subsequent to the first wireless transmission, wherein the interval of time between the second wireless transmission and the first wireless transmission is less than the maximum short IFS and equal to or greater than the minimum short IFS.

12. A system, comprising:
a receiver coupled to an antenna, the receiver to receive data of a plurality of data frames, wherein the plurality is transmitted via one of a 2.4 gigahertz (GHz), 5 GHz, and 60 GHz wireless network;
a processing module coupled to the receiver to process the plurality of data frames and decide to transmit a response for the plurality of data frames while the receiver receives data of the plurality; and
a transmitter to transmit the response, wherein:
the processing module is to generate a second portion of the response while the transmitter transmits a first portion; and
the transmitter is to begin to transmit the response at an interval of time subsequent to the receipt of the plurality of data frames, the response and the interval of time pursuant to a communications protocol, wherein:
the communications protocol provides for a variable interframe space (IFS) between wireless transmissions, with the variable IFS bounded by a maximum IFS; and
the interval of time is less than the maximum IFS;
the communications protocol provides for a minimum IFS; and
pursuant to the communications protocol, the interval of time is greater than or equal to the minimum IFS
the processing module is further to negotiate with a transmitter of the plurality of data frames on a value for the minimum IFS and a value for the maximum IFS; and
the being to transmit the response comprises beginning to transmit the response at the interval of time subsequent to the receipt of the plurality of data frames, wherein the interval of time is greater than or equal to the negotiated value for the minimum IFS and less than or equal to the negotiated value for the maximum IFS.

13. The system of claim 12, wherein:
the communications protocol provides a fixed value for the minimum IFS and a fixed value for the maximum IFS; and
pursuant to the communications protocol, the interval of time is greater than or equal to the fixed value for the minimum IFS and less than the fixed value for the maximum IFS.

14. The system of claim 12, wherein the negotiating comprises the processing module negotiating with the transmitter of the plurality of data frames on the value for the minimum IFS and the value for the maximum IFS, the values based upon one or more of the following factors:
the number of frames of the plurality of data frames;
the speed of hardware of system and of the transmitter of the plurality of data frames in switching from transmit mode to receive mode and from receive mode to transmit mode; and
whether the system comprises a separate receiver and a separate transmitter.

15. The system of claim 12, wherein:
the response comprises a block acknowledgement (BA) of the plurality of data frames;
the IFS comprises a short interframe space;
the maximum IFS comprises a maximum short IFS;
the communications protocol provides for a value of the minimum short IFS equal to 0.3 µs;
the communications protocol provides for a value of the maximum short IFS equal to 2 µs; and
the beginning comprises beginning to transmit the response at the interval of time, wherein the interval of time is less than the maximum short IFS and equal to or greater than the minimum short IFS.

16. The system of claim 12, wherein:
the processing module comprises a switch to disable the variable IFS and select a fixed IFS; and
the transmitter is to begin to transmit a response at an interval of time subsequent to the receipt of another plurality of data frames, the response and the interval of time pursuant to the communications protocol, wherein the interval of time is based upon the fixed IFS.

* * * * *